United States Patent [19]

Eastman et al.

[11] Patent Number: 4,606,955

[45] Date of Patent: Aug. 19, 1986

[54] CONDUCTIVE PYROLYZED DIELECTRICS AND ARTICLES MADE THEREFROM

[75] Inventors: Paul F. Eastman, Stoutsville; Susan W. Enouen, Columbus; William E. Hawkins, Circleville; Darrell J. Parish, Stoutsville, all of Ohio

[73] Assignee: E. I. Du Pont de Nemours and Company, Wilmington, Del.

[21] Appl. No.: 746,074

[22] Filed: Jun. 18, 1985

[51] Int. Cl.⁴ .................................................. B32B 3/12
[52] U.S. Cl. ........................................ 428/36; 428/116; 428/178; 428/408; 428/421; 428/473.5; 355/3 BE
[58] Field of Search ............. 428/473.5, 178, 408, 428/116, 117, 119, 421; 355/3 BE

[56] References Cited

U.S. PATENT DOCUMENTS

| | | | |
|---|---|---|---|
| 2,678,373 | 5/1954 | Suran | 219/19 |
| 3,385,951 | 5/1968 | Bancroft et al. | 219/384 |
| 3,424,895 | 1/1969 | Olson | 219/384 |
| 3,435,190 | 3/1969 | Schirmer | 219/384 |
| 3,616,177 | 11/1971 | Gumerman | 161/165 |
| 3,641,318 | 2/1972 | Tollet | 235/61.12 |
| 3,760,153 | 9/1973 | Davies et al. | 219/384 |
| 3,769,137 | 11/1973 | Moriyama et al. | 156/309 |
| 3,993,825 | 11/1976 | Buchan et al. | 428/216 |
| 4,015,027 | 3/1977 | Buchan et al. | 427/22 |
| 4,025,752 | 5/1977 | Whitman | 219/384 |
| 4,248,521 | 2/1981 | Brown et al. | 355/3 |
| 4,248,952 | 2/1981 | Paulin et al. | 430/62 |
| 4,278,871 | 7/1981 | Schmidt-Kufere et al. | 219/384 |
| 4,286,250 | 8/1981 | Sacchetti | 338/306 |
| 4,356,049 | 10/1982 | Tamura et al. | 156/220 |

FOREIGN PATENT DOCUMENTS 0072223  2/1983  European Pat. Off. .

Primary Examiner—George F. Lesmes
Assistant Examiner—Susan S. Rucker

[57] ABSTRACT

A conductive dielectric structure is disclosed wherein a thermoplastic matrix has a multitude of electrically conductive channels through its thickness and, optionally, at least one electrically conductive surface which, along with protective and heat seal layers, can be formed into conductive belts.

13 Claims, 3 Drawing Figures

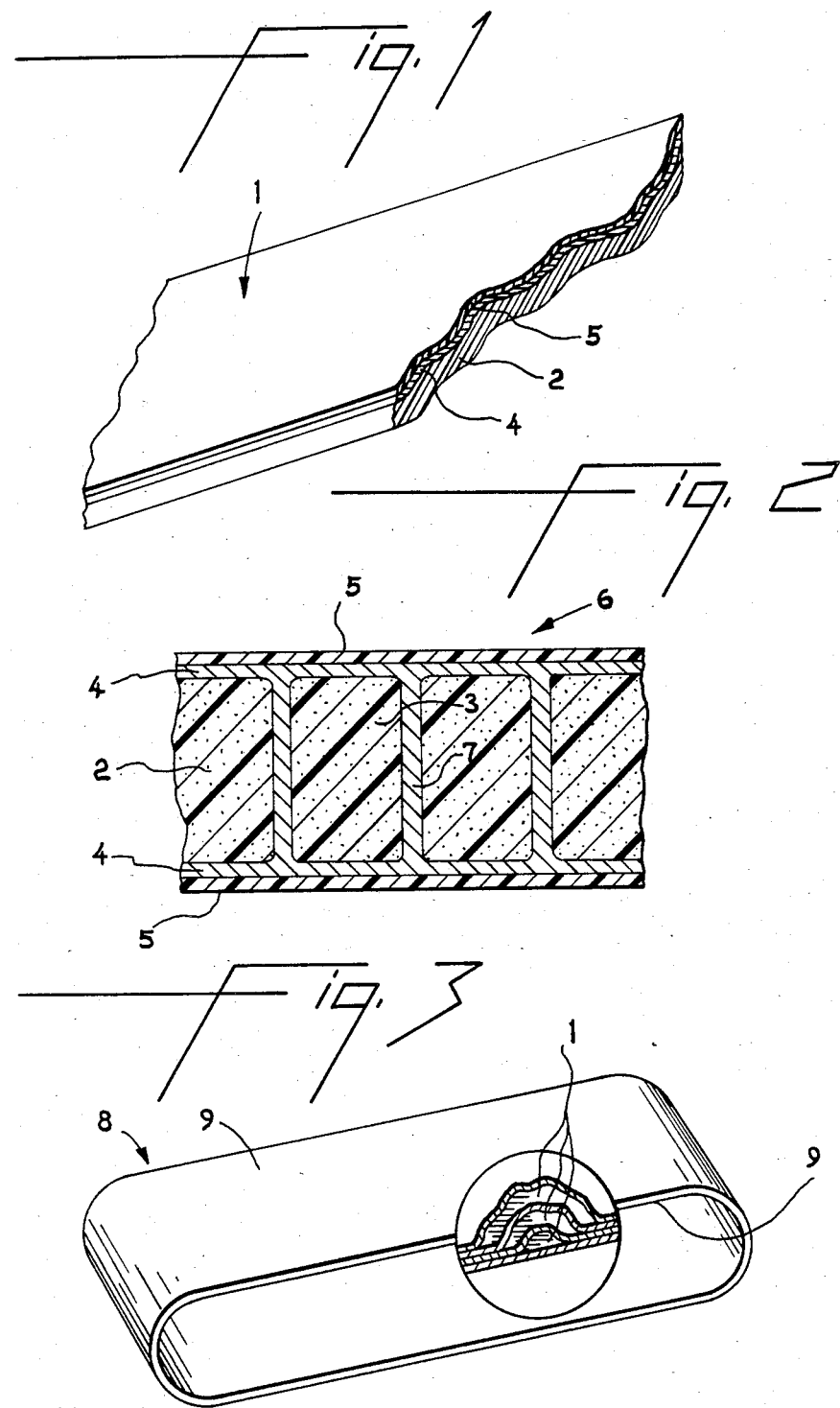

CONDUCTIVE PYROLYZED DIELECTRICS AND ARTICLES MADE THEREFROM

BACKGROUND OF THE INVENTION

1. Field of the Invention

This invention relates to selectively pyrolyzed, electrically conductive, thermoplastic web materials. In preferred forms, composites including the web materials of this invention exhibit high temperature stability and increased electrical conductivity over the surface and through the thickness of the composite. Preferred composites find use in a variety of applications including such things as image transfer belts in thermal printers and copying machines.

2. Discussion of the Prior Art

Flexible, electrically-conductive sheet materials of a variety of constructions have been previously disclosed for use in copying or image recording devices. U.S. Pat. Nos. 4,248,952 and 4,248,521 disclose such sheet materials wherein the center layer of the construction is made from electrically conductive material. U.S. Pat. Nos. 4,015,027 and 3,993,825 disclose toner transfer belts for use in electrostatic copying devices wherein the belts have a metal center layer.

Record storage media have been disclosed wherein holes in a plate of dielectric material are said to provide information by whether or not the walls of the holes have been carbonized by an electric discharge. U.S. Pat. No. 3,641,318 discloses such a plate having holes in predetermined, informational patterns. Although all of the holes do not have carbonized walls, there is disclosure that the holes can be made by electric discharge.

Electrical resistors are disclosed as made from polyimides charred by a laser beam in U.S. Pat. No. 4,286,250.

Electric discharge has been taught for perforating or bonding dielectric sheet materials in U.S. Pat. Nos. 4,278,871; 4,025,752; 3,424,895; 3,385,951; 2,678,373; and 3,760,153.

SUMMARY OF THE INVENTION

According to this invention there is provided a pyrolyzable dielectric thermoplastic, shaped article, most often in the form of a film, having a multitude of electrically conductive paths located through the article wherein the paths comprise channels with walls of carbon and wherein the electrical conductivity through the article is greatly increased thereby. In another embodiment of this invention, the pyrolyzable dielectric thermoplastic includes, homogeneously distributed throughout, a finely-divided particulate additive having a conductivity greater than the conductivity of the thermoplastic. The article of the present invention, utilizing a pyrolyzable matrix with volume conductivity of less than $10^{-12}$ mho/cm, exhibits an apparent volume conductivity of more than $10^{-5}$ mho/cm.

The article of this invention can be layered to include, for example, a pyrolyzable base film layer and a coating of another material such as a fluoropolymer. Although all layers can be made to include the conductive additive, such is not required; and, in fact, the additive is not necessarily in any layer.

The surface of the shaped article of this invention can include a coating of carbon to provide increased surface electrical conductivity and the coating of carbon can include a dielectric diluent to provide a controlled surface conductivity of, generally, from $10^{-2}$ to $10^{-17}$ mho/square.

Endless belts, such as those used for image transfer in copying machines and thermal impact printers, can be made by forming a loop of the above-discussed electrically conductive film articles with one or more layers of the film in the thickness of the belt. Such endless belts generally comprise at least one layer of the electrically conductive film and a top layer of a thermoplastic dielectric protective material.

DESCRIPTION OF THE DRAWINGS

FIG. 1 is a shaped article of the present invention, in partial section.

FIG. 2 is an enlarged cross-section of a small portion of a shaped article of the present invention.

FIG. 3 is an endless belt made from a shaped article of the present invention shown in partial cutaway to reveal layers of material in the belt construction.

DESCRIPTION OF THE INVENTION

The shaped article of this invention is shown in FIG. 1 as sheet 1 in partial cross section. Sheet 1 includes pyrolyzable thermoplastic matrix layer 2, conductive surface layer 4, and protective dielectric coating layer 5—preferably a fluoropolymer. Protective coating layer 5 is present primarily as protection to conductive surface layer 4 and to provide an exposed inert surface having heat sealing capability and a low coefficient of friction. Conductive surface layer 4 is adjacent to matrix layer 2 and can be located on one side of the matrix layer or on both sides. It is generally preferred that surface layer 4 be located adjacent to both sides of matrix layer 2. Use of layer 5 is optional, use of fluoropolymer in layer 5 is optional, but preferred, and the fluoropolymer layer, when used, is located adjacent to a conductive surface layer 4.

This invention is shown in FIG. 2 as an enlarged cross-section of a shaped article 6. Pyrolyzable, dielectric, thermoplastic matrix layer 2 is depicted, in detail, having carbon channels 7 which extend through thermoplastic material from one surface of layer 2 to the other. Carbon channels 7 result from pyrolysis of the thermoplastic layer 2 and can be hollow with carbon walls or substantially filled with carbon. Carbon channels 7 provide paths of electrical conductivity through the dielectric thermoplastic material of matrix layer 2. Conductive surface layer 4 provides electrical connection between carbon channels 7 on one surface of matrix layer 2. As previously stated, layer 5 provides protection for surface layer 4 in the form of a heat sealable, low friction, coating.

As shown in FIG. 2, matrix layer 2 can include dispersed, particulate, conductive particles 3. The conductive particles 3 are present in matrix layer 2 as an additive useful in manufacturing the article 6.

An electrically conductive, high temperature thermoplastic belt 8 is depicted in FIG. 3, in partial cutaway form, as a multiple wrap of sheet 1 covered by a fluoropolymer overlayer 9. The number of wrappings (layers) in belt 8 is optional and depends on the final use for the belt. At least one layer is required in order to assure electrical continuity and additional layers may be used for additional strength or varied electrical response.

The conductive pyrolysis product of the thermoplastic dielectric article of this invention is made by generating an electrical arc across the thickness of a pyrolyzable thermoplastic polyimide dielectric material. Under conditions of adequate current, the arc causes charring of the thermoplastic in the vicinity of the electrical discharge completely through the body of the material. The shaped article of this invention is usually in a flat form, such as a plate or sheet or film, although such is not necessarily the case. Irregular shapes and articles with irregular thicknesses are, also, contemplated by this invention. For the purposes of description herein, the shaped article will often be referred to as a sheet or a web of film.

"Pyrolyzable dielectric thermoplastic materials", as used herein, means any thermoplastic material, generally considered to be dielectric, which will char at a temperature below the melting point of the material. Examples of such materials are polyimides and polyparabonic acids. Due to the nature of the polymer, polyimides are much preferred in the practice of this invention. It has been discovered that materials such as polyesters, polyolefins, and polyamides do not form a char at a temperature below the melting point of the material and, therefore, cannot be used for practice of this invention. Pyrolyzable thermoplastic matrix materials used in this invention should exhibit a volume electrical conductivity of less than about $10^{-12}$ mho/cm and preferably less than about $10^{-16}$ mho/cm.

Preparation of the pyrolyzable dielectric materials of this invention can be facilitated by utilizing a substantially homogeneous distribution of finely-divided conductive additive material in the thermoplastic matrix sheet. The additive is used to reduce dielectric breakdown strength through the matrix sheet. As more additive is used, the dielectric breakdown strength is reduced and it becomes possible to make charring arcs closer together without arcing to the site of an adjacent char. The amount of additives to be used must depend, primarily, upon the desired center-to-center spacing of adjacent carbon channels. The dielectric breakdown strength of a sheet with additive material depends upon a multitude of factors, among which are: dielectric strength and conductivity of the additive, itself; concentration of additive; particle size of the additive; means and adequacy of distribution of the additive in the polymeric material of the sheet; and method of preparation of the sheet, itself. "Breakdown Strength" refers to the voltage required to cause an electric discharge to occur through the thickness of a dielectric material; and is usually expressed as volts per unit thickness of dielectric material.

Due to the high conductivity of carbon and due to the fact that carbon is the conductive element of the pyrolysis process ultimately used to make the conductive channels of this invention, carbon is the much preferred additive for use in this invention. Carbon black and graphite are the preferred forms of carbon. Aside from the carbon, it is generally the case that the higher the conductivity of an additive, the more effective it is and the more it is preferred in practice of this invention. As a general rule, any additive which has a conductivity greater than the pyrolyzable thermoplastic matrix sheet material will provide assistance in practice of the invention because such an additive will decrease the dielectric breakdown strength of the sheet and will, thereby, render the sheet more easily charred. Eligible particulate metal particles include silver, gold, aluminum, copper, and the like. Generally, an eligible additive material should exhibit a volume conductivity of greater than $10^{-5}$ mho/cm for use with polyimides. Carbon, in most forms, exhibits a volume conductivity of about 285 mhos/cm.

The additive material, when used, should be used in concentrations of from about 15 to 20 weight percent based on polymer sheet material. Of course, the dielectric strength of the sheet will be decreased by the presence of any amount of additive exhibiting a volume conductivity greater than the sheet material. However, it has been determined that appreciable decrease in dielectric strength is not realized until the additive is present in the sheet at a concentration of about 5 weight percent based on polymer sheet material. The upper concentration of additive does not represent an upper limit for practice of the invention so much as it represents concentration above which the physical characteristics of the polymer sheet may be altered. It should be understood, however, that a concentration of conductive additive so high that the additive forms a continuous, conductive path through the sheet, will render the sheet so conductive that it cannot be charred by application of voltage in accord with the practice of this invention. It has been found that, in polyimide, the yield strength is reduced below usually desirable levels by particulate carbon in concentrations of greater than about 25 weight percent. Also, it is believed that a concentration of carbon greater than about 25 weight percent results in electrical conductivity rather than breakdown. For use as guidelines of practice rather than as limits for the invention, carbon concentrations from about 5 to 20 weight percent are preferred for use with polyimide sheet and from about 15 to 20 weight percent is most preferred and usually used.

Because the conductive construction of this invention is usually required to be smooth, the additive material should be of a size to provide the required smoothness. It has been found that additive particles of a maximum diameter of less than about 0.5 micrometers should yield a surface having a smoothness of about 0.12–0.19 micrometers. While additive particle size has an effect on the dielectric strength of sheet containing the additive to the extent that, for a given additive concentration, smaller particles result in decreased dielectric strength and larger particles result in increased dielectric strength, the effect has not been found to be great. Average additive particle sizes of from about 0.2 to 0.8 micrometers have been found to yield desired dielectric strengths when the additives are used in recommended concentrations; and a broader range of particle sizes can also be used.

The additive materials can be blended into the polymeric sheet material in any of the several known ways. For example, in the case of pyrolyzable thermoplastic polymeric materials which are extruded into sheet form, the additive can be dispersed in the molten polymer prior to extrusion. Of course, the additive can also be dispersed in a liquid system for polymerizing the thermoplastic and, thereby, be present when the polymer is initially created. In the case of polymeric materials formed into sheet by being cast from a solvent system, the additive can be dispersed in the solvent system, the polymer component or the solvent component or both, before the sheet formation. In such a case, care must be exercised to maintain a substantially homogeneous distribution of the additive throughout the sheet formation process. In the case of polymerization or congealation of the polymer after formation or casting of the sheet from a liquid system, the additive can be dispersed in the liquid sheet forming system and, thereby carried, in homogeneously dispersed form, into the resulting sheet. As an example of dispersing the additive in a liquid sheet forming system prior to sheet formation by polymerization or congealation, there can be mentioned the procedure for including additives in polyimide sheet as is disclosed in U.S. Pat. No. 3,287,311. It can be noted that the disclosure of that patent includes polyimide formation by chemical means and by thermal means, both of which means are now well known. It has been found that, for the same amount of additive, polyimide formed by thermal means often exhibits higher conductivity than polyimide formed by chemical means.

The article of this invention can be made of a single layer of pyrolyzable thermoplastic material or, if required or desired for some reason, can include two or more pyrolyzable thermoplastic materials in at least two layers. In the event that it is desired or required, for example, to have an article with a surface of low coefficient of friction or one that can be adhered to other materials, it has been found useful to coat the underlying thermoplastic with a fluoropolymer or other polymeric coating material. Of course, it is understood that the underlying thermoplastic can, also, include more than one layer of more than one pyrolyzable dielectric thermoplastic. Fluoropolymers are preferred as coating materials and exemplary fluoropolymers include polymers and copolymers of tetrafluoroethylene (TFE) such as copolymers of TFE and hexafluoropropylene (HFP), copolymers of TFE and perfluoropropyl vinyl ether, and the like.

A polymeric coating can be applied to the underlying pyrolyzable thermoplastic by any of the well known means for accomplishing such an application. The polymer can be extruded onto a sheet of the underlying thermoplastic. The polymer can be applied as a solvent solution or as a latex dispersion or a film of the polymer can be simply bonded or heat sealed to the underlying thermoplastic. One or both sides of underlying thermoplastic sheets and all or only a portion of other shaped articles can be coated.

As is the case with the underlying pyrolyzable thermoplastic before application of the coating, the coating can include a substantially homogeneous distribution of finely-divided electrically conductive additive material. The use of such additive is preferred but not necessary, however, and the pyrolyzable dielectric thermoplastic shaped article of this invention can be made wherein the thermoplastic matrix material includes at least one layer of underlying pyrolyzable thermoplastic, either with conductive additive or without, combined with at least one layer of a coating material, such as a fluoropolymer, either with conductive additive or without.

Electrically conductive carbon channels burned through the thickness of a pyrolyzable dielectric thermoplastic matrix suffice to provide electrical conductivity through the thickness of that article. In cases where there is also required a surface conductivity, it has been found that carbon, preferably, in the form of graphite, can be burnished onto the surface of the article and, thereby, provide electrical conductivity along the surface and, at the points where carbon has been burnished onto the ends of the carbon channels, through the thickness of the article. The combination of burnished carbon and charred carbon channels provides the pyrolyzed dielectric thermoplastic article of this invention with electrical conductivity through the article and along the surface of the article.

The most important qualities by which the articles of this invention are evaluated are various qualities of electrical conductivity. Surface conductivity is a measure of the electrical conductivity along a surface being evaluated and is determined by placing two, straight, ohmmeter electrodes of equal length on the surface in question such that the electrodes form opposite sides of a square. The resistance measured between those electrodes is surface resistivity and the appropriate units are ohms per square. Surface conductivity is the reciprocal of surface resistivity.

Volume conductivity is a measure of the electrical conductivity through a material being evaluated and is determined by placing two ohmmeter electrodes of equal area on directly opposite sides of the material in question. The resistance measured between those electrodes multiplied by the area of the electrodes and divided by the thickness of the material is the volume resistivity and the appropriate units are ohm-centimeters. Volume conductivity is the reciprocal of volume resistivity and the units are mho/cm.

In determining the volume conductivity of the articles of the present invention, there are involved the volume conductivities of the uncharred matrix material and of the conductive carbon channels. Such a volume conductivity is determined using ohmmeter electrodes with an area great enough to cover several of the pyrolyzed channels—typically, electrodes of 35-40 $cm^2$ have been used—and, because the determination represents a mixture or blend of conductivities, it is termed an apparent volume conductivity.

Although high surface conductivity can be obtained by burnishing graphite onto the surface of an article of this invention, the surface conductivity thus obtained appears to be from about 0.01 to 0.002 mho/square on fluoropolymer-coated polyimide and not significantly altered by variation in the degree or extent of burnishing. The surface conductivity of graphite burnished onto polyimide without any coating appears to be about 2 to $5 \times 10^{-4}$ mho/square and not significantly altered by variation in the degree or extent of burnishing. It has been found that the surface conductivity of burnished graphite can be controlled from about 0.002 mho/square to practically zero by combining a finely-divided dielectric diluent with the graphite prior to burnishing. The combination of graphite and particulate dielectric is burnished onto the surface of the article and the dielectric diluent interferes with complete surface coverage by the graphite, thus decreasing the surface conductivity. By adjusting the proportion of dielectric diluent material, the surface conductivity can be controlled. As a general rule, the decrease in surface conductivity is not a linear function of dielectric in the graphite burnishing combination but it can be stated that a half-and-half, by weight, combination of graphite and mica yields a surface conductivity of about 0.005 mho/square and that a combination having 5 weight percent graphite and 95 weight percent mica yields a surface conductivity of about 0.0005 mho/square on fluoropolymer-coated polyimide.

To make the article of this invention in a sheet form, the nonconductive starting sheet can be placed between electrical probes with an increasing voltage impressed across the probes until an arc is struck through the sheet, thus creating a channel of charred sheet material in the area of the arc. Such arcs, struck close together in the sheet, result in a sheet of dielectric material which exhibits the electrical conductivity of this invention.

The voltages required for making the channels of pyrolyzed (charred) conductive material of this invention vary in accord with many factors but the conditions should be adjusted to cause char formation with the least sheet deformation. Factors which affect the voltage required for arcing include the thickness, kind, and dielectric strength of the matrix dielectric; the kind, conductivity, concentration, dielectric strength, and proximity of particles of the additive, if an additive is used; and the size and configuration of the probes and the way that the voltage is generated.

The pyrolyzed material in the channels is, generally, about 10 to 30 micrometers in diameter and the affected border around the material may extend for as much as 5–50 additional micrometers. The channels may be, therefore, about 20–130 micrometers in diameter at the article surfaces.

As stated, the electrical arcing system should be set up to deliver sufficient current through the dielectric during arcing to create pyrolyzed walls in the channels. Magnitude of the current is affected by voltage buildup between arc strike and the current discharge rate of the arcing system.

For polyimide dielectric sheet materials of about 25 micrometers thickness and no conductive additive, the arcing voltages have been found to be from about 6500 to 8000 volts, DC. Increase in thickness increases the required voltage. When conductive additives are used, the voltage requirements are decreased. As an example, a polyimide sheet (25 micrometers thick) with no additive has been found to require about 7000 volts, DC, to arc using a sharp grounded probe against a charged plate; and, in the same conditions, only 1500 volts, DC, are required when the polyimide includes 9 weight percent carbon and only 380 volts when 19 weight percent carbon is present.

Arcing of the film can, of course, be conducted utilizing more than one probe such as by using a bed including a multitude of probes which can be rolled against a charged plate with the dielectric material positioned therebetween.

DESCRIPTION OF THE PREFERRED EMBODIMENTS

EXAMPLE 1

In this example, a conductive dielectric sheet was prepared from a laminate of three layers of two kinds of thermoplastic materials.

The laminate included a polyimide film about 25 micrometers thick having no conductive additive and, on each side of the polyimide, a layer of fluoropolymer about 2.5 micrometers thick having 3 weight percent carbon distributed homogeneously throughout. The surface conductivity of the fluoropolymer layers, was about $10^{-8}$ mho/square.

The polyimide used herein was a commercial product sold under the trade designation Kapton H by E. I. du Pont de Nemours & Co., Wilmington, Del., U.S.A. The fluoropolymer used herein was a commercial product sold in the form of an aqueous dispersion under the trade designation Teflon FEP by E. I. du Pont de Nemours & Co.

The fluoropolymer dispersion and a finely-divided graphite were dispersed in deionized water to yield a coating composition which was 11 weight percent solids wherein the solids were 97 weight percent fluoropolymer and 3 weight percent graphite. The graphite used was a commercial product sold under the trade designation Aquadag Graphite Coating by Acheson Colloids Co. The coating composition was applied to both surfaces of the polyimide by a doctor roll coating process such that, when the coating was dried, a smooth even coating resulted about 2.5 micrometers thick on each side.

The laminate was drawn over a plate charged to 7000 volts, DC, and grounded probes having point diameters of about 0.7 millimeter were touched to the laminate every 12.7 millimeters to yield a dielectric web of thermoplastic material having a gridwork of pyrolyzed, electrically conductive, paths through the web. The conductive paths formed in this example were channels of carbon less than 0.13 millimeter in diameter and exhibiting 5 to 10 ohms electrical resistance through the web. Volume electrical conductivity through the web without channels of carbon was about $10^{-17}$ mho/cm and the apparent volume electrical conductivity of the laminate after pyrolysis was $1.13 \times 10^{-4}$ mho/cm.

As to the voltage which is applied to the plate, care should be used to operate at the lowest current which reliably will produce pyrolysis. Too little current will not permit creation of adequate carbon channels but too much current will cause overheating and distortion of the material. In the case of this example, reliable and effective arcing could not be accomplished below about 6500 volts, DC and the web was distorted above about 8000 volts, DC. The distortion can be lessened by first contacting the web with the electrical ground, raising the voltage on the charged plate until arcing occurs, and then reducing the voltage to advance the web into a new position.

EXAMPLE 2

In this example, a conductive dielectric sheet was made from aluminum-powder-filled polyimide material.

A polyamide acid dope was made by adding, dropwise, 21.5 grams of pyromellitic dianhydride to a stirred solution consisting of 20 grams of 4,4'-oxydianiline and 180 grams of dimethylacetamide. The resulting system was about 20 weight percent polyamide acid and the polyamide acid exhibited an inherent viscosity of 1.6 dl/gm.

For the purpose of this example, the above-prepared dope was combined with a slurry of 20 grams of aluminum powder (1–2 micrometer average diameter) and 60 milliliters of dimethylacetamide.

To produce thermally-converted polyimide material, a portion of the aluminum-filled polyamide acid dope was spread onto a glass plate and heated for about 20 minutes at about 100°–110° C. The plate and the film thereon were cooled; the film was stripped from the plate; and the film was heated under dimensional restraints for about 30 minutes at about 300° C. The resulting film had a thickness of about 38 micrometers and exhibited a surface conductivity of $2.3 \times 10^{-3}$ mho/square.

To produce chemically-converted polyimide material, a portion of the aluminum-filled polyamide dope was spread onto a glass plate and the glass plate was immersed in a solution of equal volumes of acetic anhydride and beta-picoline for 3–5 minutes. The film was stripped from the plate and was heated under dimensional restraints for about 30 minutes at about 300° C. to completely cure the material. The resulting film had a thickness of about 48 micrometers and exhibited a surface conductivity of $1.41 \times 10^{-11}$ mho/square.

The thermally-converted material was found to have a volume electrical conductivity of $2 \times 10^{-10}$ mho/cm and could not be pyrolyzed by means of the applied voltage in accord with practice of this invention. It has been determined that starting materials with a volume electrical conductivity of greater than about $10^{-12}$ mho/cm are too conductive for use in practice of the present invention. The chemically-converted material was found to have a volume electrical conductivity of $10^{-16}$ mho/cm before pyrolysis, a dielectric breakdown voltage of about 21 volts per micrometer. After pyrolysis, the material was found to have a resistance through the pyrolyzed part of the sheet of 15–30 ohms, a closest carbon channel spacing of 1.5–2 millimeters and an apparent volume electrical conductivity of $6.15 \times 10^{-5}$ mho/cm.

EXAMPLE 3

In this example, a conductive dielectric sheet was made from carbon-filled polyimide material.

The polyamide acid dope of Example 2 was combined with 9.8 grams of a finely-divided carbon and a polyimide web was made therefrom in accordance with the procedure described in Example 2 for chemical conversion. The carbon used was graphite having a particle size of about 0.5 micrometers.

A laminate sheet was prepared as described in Example 1, above, using the carbon-filled polyimide of this Example 3 and the laminate was positioned over a plate charged to about 4000 volts, DC. A grounded electrode disc having a contact edge with a radius of 0.79 millimeter was rolled transversely across the web over the charged plate at a speed of about 8 centimeters per second. The web was indexed across the plate at the end of each grounded roller pass to obtain a 1.5 millimeter space between disc passes. This arrangement produced arcing and carbon channels about every 2 to 2.5 millimeters in the path of electrode disc travel. The carbon channels produced in this Example 3 exhibited an apparent volume conductivity of $9.3 \times 10^{-5}$ mho/cm.

Polyimide having other concentrations of carbon is useful and can be used. It was found that a sample with 19 weight percent carbon prepared as in the above example and exhibiting a volume conductivity of $10^{-14}$ mho/cm under the above conditions, permitted generation of the most closely spaced carbon channels. The channels were spaced 0.33 millimeters between holes and the sample exhibited an apparent volume conductivity of $2 \times 10^{-4}$ mho/cm.

EXAMPLE 4

The surface conductivity of the pyrolyzed dielectric material from Example 3 was determined to be about $10^{-8}$ mho/square. To increase the surface conductivity of that material, highly conductive graphite powder was burnished into the surface of the fluoropolymer coating. The burnishing was conducted by applying graphite powder on the sheet and rubbing the powder with a flat rubber block in a rotary motion.

The surface conductivity of the thus-burnished surface was determined to be 0.002 to 0.005 mho/square. That surface conductivity was found to be relatively constant and invariable in attempts to alter the conductivity by altering the amount of graphite burnished onto the surface of the article.

EXAMPLE 5

The pyrolyzed conductive dielectric of Example 4 was made again except that the surface conductivity was decreased in a controlled way.

The surface conductivity was controlled by combining the graphite with finely-divided mica in desired proportions before burnishing the mixture onto the surface of the article. By this means of diluting the graphite any surface conductivity can be obtained in the range of $10^{-17}$ mho/square (the value for the polyimide of this example) to 0.002 to 0.005 mho/square (the value for a surface burnished with pure graphite). In this example, 1 weight part of graphite and 39 weight parts of mica having a particle size of about 1–3 micrometers were intimately mixed together and the mixture was burnished onto the surface of the pyrolyzed dielectric in the manner of Example 4. The surface conductivity of the thus-burnished surface was determined to be 1 to $2 \times 10^{-3}$ mho/square.

EXAMPLE 6

An endless belt was made for use as an image transfer medium in a triboelectric copying device or a nonimpact printer. The pyrolyzed conductive dielectric web of Example 1, having; closely spaced carbon channels, an apparent volume conductivity of $1-2 \times 10^{-3}$ mho/cm through the web, and a surface conductivity of 1 to $2 \times 10^{-6}$ mho/square was ideally suited for construction of an endless belt for electrostatic applications.

A circular internal mold shell of high thermal expansion (Brass—$18 \times 10^{-6}$ cm/cm/C) was wrapped with two layers of polyimide film to serve as a mold release material after formation of the belt. The polyimide film was the Kapton H previously identified in Example 1, above. Once the polyimide release layers were wrapped, exactly three layers of the conductive dielectric web of Example 5 and a single overlayer wrap of a fluoropolymer were placed thereon, followed by two layers of the polyimide film mold release material. The fluoropolymer was a film 12.7 micrometers thick, made from a copolymer of tetrafluoroethylene and perfluoropropylvinyl ether. The fluoropolymer was the same as that sold by E. I. du Pont de Nemours & Co. under the trade designation Teflon CLP.

The mold release materials were cut to a size permitting a cuff extending at least 5 centimeters from the mold to be used for gripping the belt to remove it from the mold. If desired, a release agent, such as graphite, can be applied to the mold surfaces prior to building the belt.

Once the belt was built up, as described above, a circular external mold of thermal expansion lower than that of the brass internal mold (Stainless—$10.8 \times 10^{-6}$ cm/cm/C) was placed over the assembly. The internal and external molds were made with radii differing by 0.175 millimeters so that the molding cycle would create high compressive forces by virtue of the different expansion rates of the mold parts. The entire mold assembly was heated to about 300° C. for about 10 minutes and was then permitted to cool in ambient conditions.

The belt was pulled by its cuffs from the mold, the release sheets were removed, and the belt edges were trimmed.

The belt exhibited an inside surface conductivity of $1.5-2.0 \times 10^{-4}$ mho/square an apparent volume conductivity of $6.5 \times 10^{-10}$ mho/cm through the three layers of conductive dielectric web, and a squareness of ±0.055 millimeters from one edge of the belt to the other per meter of hoop length.

The product of the present invention is an apparently electrically conductive, polymeric sheet material. Such a material finds ready application in the fields of electronics, communications, office machines, and the like, where toughness and flexibility are required in conjunction with the requirement of electrical conductivity. Electrically conductive packaging materials are needed to prevent damage to electronic parts by generation of static electricity under conditions of shipping and storage. Electrically conductive pyrolyzed thermoplastic constructions find use in such varied applications as shielding and filtering radio signals, resistance heating, and electrical coupling devices, and, of course, the image transfer belts for copying machines and nonimpact thermal printers as particularly disclosed herein.

We claim:

1. A dielectric thermoplastic shaped article comprising: (a) a pyrolyzable thermoplastic matrix material having a volume electrical conductivity less than $10^{-12}$ mho/cm; and (b) a multitude of electrically conductive paths in the form of channels with walls of carbon from one matrix surface to the other matrix surface throughout the thermoplastic matrix, whereby the channels are 20–130 micrometers in diameter at the surface of the article and the apparent volume electrical conductivity through the article is more than $10^{-5}$ mho/cm.

2. The shaped article of claim 1 wherein the thermoplastic matrix is polyimide.

3. The shaped article of claim 1 wherein the thermoplastic matrix includes, homogeneously distributed throughout, from 5 to 20 weight percent electrically conductive finely-divided particulate additive having a greater electrical conductivity than the thermoplastic matrix.

4. The shaped article of claim 1 in the form of a film of material.

5. The film of claim 4 wherein at least one surface of the film has a fluoropolymer coating and, further, wherein the fluoropolymer coating has, homogeneously distributed throughout, an amount of electrically conductive finely-divided particulate additive sufficient that the fluoropolymer coating has a greater electrical conductivity than the film without the coating.

6. The film of claim 4 wherein at least one surface of the film includes an electrically conductive coating of carbon.

7. The film of claim 5 wherein at least one surface of the fluoropolymer coating includes an electrically conductive coating of carbon.

8. The film of claim 6 wherein the electrically conductive coating includes graphite and mica and exhibits a surface conductivity of from $10^{-2}$ to $10^{-17}$ mho/square.

9. The film of claim 7 wherein the electrically conductive coating includes graphite and mica and exhibits a surface conductivity of from $10^{-2}$ to $10^{-17}$ mho/square.

10. An endless belt comprising a base loop having at least one layer of a film of thermoplastic comprising: (a) a pyrolyzable thermoplastic matrix material having a volume electrical conductivity less than $10^{-12}$ mho/cm; and (b) a multitude of electrically conductive paths randomly located throughout the matrix wherein the paths comprise channels with walls of carbon from one matrix surface to the other matrix surface and wherein the channels are 20–130 micrometers in diameter at the surface of the article and the apparent volume electrical conductivity through the base loop is more than $10^{-5}$ mho/cm; and an outer sleeve of dielectric thermoplastic film with a volume electrical conductivity less than $10^{-12}$ mho/cm.

11. The endless belt of claim 10 wherein the film of the base loop has a fluoropolymer coating and the fluoropolymer coating has, homogeneously dispersed throughout, an amount of electrically conductive finely-divided particulate additive sufficient that the fluoropolymer coating has a greater electrical conductivity than the film of the base loop without the coating.

12. The endless belt of claim 11 wherein at least one surface of the fluorocarbon coating includes an electrically conductive coating of carbon.

13. The endless belt of claim 12 wherein the electrically conductive coating includes graphite and mica and exhibits a surface conductivity of from $10^{-2}$ to $10^{-17}$ mho/square.

* * * * *